(12) United States Patent
Kato (10) Patent No.: US 9,217,883 B2
(45) Date of Patent: Dec. 22, 2015

(54) OPTICAL MODULATOR MODULE, INTEGRATED CIRCUIT FOR DRIVING OPTICAL MODULATOR, AND METHOD FOR MODULATING OPTICAL SIGNAL

(75) Inventor: Tomoaki Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 145 days.

(21) Appl. No.: 14/234,853

(22) PCT Filed: Jun. 1, 2012

(86) PCT No.: PCT/JP2012/003631
§ 371 (c)(1),
(2), (4) Date: Jan. 24, 2014

(87) PCT Pub. No.: WO2013/018263
PCT Pub. Date: Feb. 7, 2013

(65) Prior Publication Data
US 2014/0169723 A1 Jun. 19, 2014

(30) Foreign Application Priority Data

Aug. 2, 2011 (JP) .................................. 2011-169123

(51) Int. Cl.
*G02F 1/01* (2006.01)
*G02F 1/035* (2006.01)
(Continued)

(52) U.S. Cl.
CPC .............. *G02F 1/011* (2013.01); *G02F 1/0327* (2013.01); *G02F 1/0516* (2013.01); *H04B 10/548* (2013.01); *G02F 1/225* (2013.01); *G02F 1/2257* (2013.01); *G02F 2001/212* (2013.01)

(58) Field of Classification Search
CPC ......... G02F 1/011; G02F 1/015; G02F 1/017; G02F 1/03; G02F 1/0327; G02F 1/0516; G02F 1/225; G02F 1/2257; G02F 2201/16; G02F 2201/127; G02F 2001/212; H04B 10/548; H04B 10/556

USPC .............................. 385/1–3, 14; 398/182–202
See application file for complete search history.

(56) References Cited

U.S. PATENT DOCUMENTS 8,744,219 B2 * 6/2014 Kato ................................ 385/3

FOREIGN PATENT DOCUMENTS

JP 2003-177365 A 6/2003
WO 2011/043079 A1 4/2011

OTHER PUBLICATIONS

Tomoaki Kato et al., "10-Gb/s-80-km operation of full C-band InP MZ modulator with linear-accelerator-type tiny in-line centipede electrode structure directly driven by logic IC of 90-nm CMOS process", Optical Society of America, 2011,OFC/NFOEC 2011, ThP4.

(Continued)

*Primary Examiner* — Akm Enayet Ullah
*Assistant Examiner* — Michael Mooney (57) ABSTRACT

Waveguide-type optical phase modulator regions of a linear accelerator-type column electrode structure MZ optical modulator are arranged on a semiconductor optical waveguide. A transmission line of an integrated circuit receives a clock signal through a buffer circuit disposed on an input side. Clock terminators are connected between an end of the transmission line and clock terminator power supply electrodes (VCa, VCb). Individual driving circuits receive the clock signal from different positions of the transmission line. An i ($1 \leq i \leq m$, i is an integer)-th individual driving circuit counted from the input side outputs a signal obtained by amplifying a digital input signal in synchronization with the clock signal to an i-th waveguide-type optical phase modulator region.

17 Claims, 3 Drawing Sheets

(51) Int. Cl.
*H04B 10/548* (2013.01)
*G02F 1/03* (2006.01)
*G02F 1/05* (2006.01)
*G02F 1/225* (2006.01)
*G02F 1/21* (2006.01)

(56) References Cited

OTHER PUBLICATIONS

Tomoaki Kato et al., "InP MZ modulator with linear-accelerator-type tiny in-line centipede electrode structure for direct-drive with CMOS logic IC", The Institute of Electronics, Information and Communication Engineers, IEICE Technical Report, 2011, C-3-30.

Tomoyuki Yamase et al., "10-Gb/s In-line Centipede Electrode InP MZM and Low-Power CMOS Driver with Quasi-Traveling Wave Generation", The 16th Opto-Electronics and Communications Conference, OECC 2011, Jul. 4-8, 2011, pp. 61-62.

International Search Report for PCT Application No. PCT/JP2012/003631, mailed on Sep. 11, 2012.

* cited by examiner

OPTICAL MODULATOR MODULE, INTEGRATED CIRCUIT FOR DRIVING OPTICAL MODULATOR, AND METHOD FOR MODULATING OPTICAL SIGNAL

This application is a National Stage Entry of PCT/JP2012/003631 filed Jun. 1, 2012, which claims priority from Japanese Patent Application 2011-169123 filed Aug. 2, 2011, the contents of all of which are incorporated herein by reference, in their entirety.

TECHNICAL FIELD

The present invention relates to an optical modulator module, an integrated circuit for driving an optical modulator, and a method for modulating an optical signal.

BACKGROUND ART

With the explosive increase in demand for a broadband multimedia communication service such as the Internet or a high-definition digital TV broadcast, a dense wavelength-division multiplexing optical fiber communication system, which is suitable for a long-distance and large-capacity transmission and is highly reliable, has been introduced in trunk line networks and metropolitan area networks. In access networks, an optical fiber access service spreads rapidly. In such an optical fiber communication system, cost reduction for laying optical fibers as optical transmission lines and improvement of spectral efficiency per optical fiber are important. Therefore, a wavelength-division multiplexing technology which multiplexes multiple optical signals having different wavelengths is widely used.

In an optical transmitter for a wavelength-division multiplexing communication system, an optical modulator is required. In the optical modulator, high-speed optical modulation with small wavelength dependence is indispensable. Further, an unwanted optical phase modulation component which degrades the waveform of the received optical signal after long-distance transmission (in the case of using optical intensity modulation as a modulation method), or an optical intensity modulation component (in the case of using optical phase modulation as a modulation method) should be suppressed to be as small as possible. A Mach-Zehnder (MZ) optical intensity modulator in which waveguide-type optical phase modulators are incorporated into a pair of delay paths in an optical waveguide-type MZ interferometer is suitable for such a use.

In a currently used MZ optical intensity modulator, lithium niobate ($LiNbO_3$, hereinafter referred to as "LN"), which is a typical electro-optic crystal having a Pockels effect in which the refractive index linearly changes with respect to an applied electric field, is used as a substrate. This MZ optical intensity modulator is based on a Ti-diffused optical waveguide circuit of a so-called planar structure that uses the phenomenon in which a region obtained by diffusing titanium (Ti) deposited on the surface thereof into the substrate at high temperature has a high refractive index. As a specific configuration of the planar optical waveguide circuit, a configuration is generally employed in which a pair of a waveguide-type optical phase modulator and a waveguide-type optical multiplexer/demultiplexer is monolithically integrated on the LN substrate to from an MZ interferometer, and electrodes for applying an electric field to this waveguide-type optical phase modulator are provided.

In addition, attempts have been actively made to develop an optical waveguide-type semiconductor optical phase modulator and a semiconductor MZ optical modulator by using a III-V compound semiconductor, such as gallium arsenide (GaAs) or indium phosphide (InP), which is a direct transition type semiconductor useful for integration of a light source element. The optical phase modulator regions of these modulators are formed of a single-mode optical waveguide having a p-i-n type diode structure of a double heterostructure. In this configuration, a high refractive index layer (core layer) that is undoped and has low bandgap energy is formed of a medium (for example, multiple mixed crystal of a III-V compound semiconductor, or a layered structure based on this) whose (complex) refractive index with respect to a optical signal to be modulated changes depending on the field strength. The high refractive index layer (core layer) is sandwiched between low refractive index layers (cladding layers) which have p-type and n-type conductivities, respectively, and are formed of semiconductor having bandgap energy higher than that of the high refractive index layer (core layer). An electric field necessary for optical modulation is generated by applying a reverse bias voltage to the p-i-n type diode structure.

As for the optical modulation efficiency of these MZ optical modulators, in general, when the modulation frequency is in the vicinity of a direct current, the wavelength of a modulation electric signal is substantially in reverse proportion to the length of each optical phase modulator region. Accordingly, it is advantageous to increase the length of each optical phase modulator region so as to reduce a driving voltage amplitude. However, when the modulation frequency is high and the length of each optical phase modulator region is equal to or greater than the propagating wavelength of the modulation electric signal, a modulation electric signal distribution along an optical signal propagation axis of each optical phase modulator region cannot be regarded as being uniform. For this reason, the optical modulation efficiency (or driving voltage amplitude) does not satisfy the inversely proportional relationship with the length of each optical phase modulator region. As the length of an optical phase modulator region increases, the capacitance increases, which hinders improvement in modulation bandwidth. To solve such a problem inherent in increasing the length of the modulator so as to reduce the driving voltage, a so-called travelling-wave electrode is generally used. In the travelling-wave electrode, each optical phase modulator region is regarded as being a transmission line, and a modulation electric signal to be applied to the transmission line is regarded as being a travelling wave. Further, contrivance is made to approximate the phase velocities so that the interaction length between the modulation electric signal and the optical signal to be modulated becomes as long as possible. The optical modulator having such a travelling-wave electrode structure is commercially available and widely used as a key component of an optical transmitter for a long-distance, large-capacity optical fiber communication system of 2.5 to 40 Gb/s.

It is considered that the demand for increasing the transmission capacity for an optical fiber communication system has been increasing, along with an increasing demand for communication. However, if the capacity for this system is increased by continuously increasing only the modulation speed of the conventional binary digital optical intensity modulation without changing the optical fiber serving as a transmission path, it is inevitable that the transmission speed will increase and the optical wavelength at the reception end significantly deteriorate. This is because even when an ideal travelling-wave optical modulator with sufficiently high speed and suppressed wavelength chirping is used, the modulator is affected by the dispersion in the optical fiber and the non-linear effect. For this reason, it is not practical, in view of expandability, that an increase in transmission capacity is required only for high-speed modulation.

It is anticipated that such a problem can be solved and the transmission distance and bandwidth utilization efficiency can be further increased, by applying, to optical communications, complex amplitude multilevel or subcarrier multiplexing techniques, such as a quadrature amplitude modulation (hereinafter "QAM") system and an orthogonal frequency division multiplex (hereinafter "OFDM") modulation system, which have first been put into practical use in the field of radio communications. In these optical modulation systems, a combination of an amplitude and a phase (or a real part and an imaginary part) of an optical signal is correlated with multiple bits of modulation data, and an optical modulation signal becomes a complex optical modulation signal. That is, increasing the spectral efficiency of an optical modulation code means setting the level of each of the amplitude and the phase of the optical signal to multilevel values.

To generate such a complex optical modulation signal by using the above-mentioned travelling-wave optical modulator, the modulation electric signal to be applied thereto needs to be changed from a binary digital signal to a multilevel pseudo analog signal. When an analog electric signal having an arbitrary amplitude is generated in a pseudo manner, a digital-to-analog converter (hereinafter "DAC") that satisfies a set resolution (the number of bits) depending on the grayscale and a required settling time has been widely used. However, only a conversion rate of about several GHz is obtained in the search and development stages, though the conversion rate depends on the internal circuit configuration of the DAC and the like. As the settling time becomes shorter, the set resolution of the output amplitude tends to be lower (the number of bits of the converted output decreases). At present, the resolution of the DAC that can achieve a settling time of about several 100 psec is 4 to 6 bits (16 to 64 grayscales) at most. This is not sufficient for application to a multilevel/multiplexing optical modulator in view of discretization errors.

In addition, 1 Vp-p or more of a maximum voltage (or maximum current) amplitude to be output can hardly be expected to be adaptable to generation of a pseudo analog waveform of several GHz. It is necessary to provide a driving circuit (integrated circuit) for linearly amplifying the analog electric signal output from the DAC with as small a distortion as possible to obtain a sufficient voltage amplitude (at present, about 3.3 to 7 V) for driving the optical modulator. However, also in this case, it is not easy to truly amplify the analog electric signal linearly, which varies at a high rate of several tens of GHz, even if the characteristics of the amplification element itself are improved and the circuit is devised.

It is considered that such a problem inherent in the generation of the multilevel/multiplexing optical modulation signal by use of the optical modulator having a travelling-wave electrode structure is caused due to the fact that there is only one excitation point at which the modulation electric signal is applied to the travelling-wave electrode. Therefore, to solve such a problem, it is necessary to review the existing travelling-wave optical modulator that drives each optical phase modulator region from only one excitation point, and to develop a new structure and a drive system suitable for the new structure. As a specific example thereof, a linear accelerator-type column electrode structure optical modulator is proposed (Non Patent Literatures 1 and 2). The linear accelerator-type column electrode structure optical modulator has a configuration in which a plurality of short optical phase modulators is connected in cascade and dedicated individual driving circuits are provided for each optical phase modulator. The individual driving circuits are sequentially driven at a timing when a optical signal to be modulated sequentially passes through the row of optical phase modulators.

It is expected that the linear accelerator-type column electrode structure can effectively solve the above-mentioned problem inherent in the travelling-wave optical modulator. However, to fully exploit the performance of this structure, as described above, it is necessary to provide an individual driving circuit for each of the short optical phase modulators, and the configuration in which the individual driving circuits are sequentially driven in synchronization with the timing when the optical to be modulated signal sequentially passes through the optical phase modulators connected in cascade. In consideration of such conditions, it is required that a variation in synchronization signal input of each of the individual driving circuits and a variation in propagation delay of the driving signal output be suppressed to the picosecond (psec) order or less, though the variations depend on the number of stages connected in cascade and the length of each optical phase modulation region.

Accordingly, in terms of the control for the propagation time in electrical lines, an integrated circuit in which a plurality of individual driving circuits is monolithically integrated on a semiconductor substrate is desirably used as a drive IC exclusively used for the linear accelerator-type column electrode structure. Further, a routing line to each optical modulator from a drive output signal terminal of the integrated circuit is desirably as short as possible. For the reasons regarding the propagation time control as described above, the integrated circuit that is disposed in the direction parallel to the propagation axis of the optical signal to be modulated, i.e., disposed in the vicinity of the long side of the optical modulator, can have the most practical configuration. Such a layout example of the integrated circuit has already been proposed (Patent Literature 1). At present, an InP-based MZ optical intensity modulator having such a linear accelerator-type column electrode structure and an integrated circuit manufactured by a leading CMOS process have been produced experimentally and continuously reviewed to demonstrate the possibility thereof.

Figure 3:
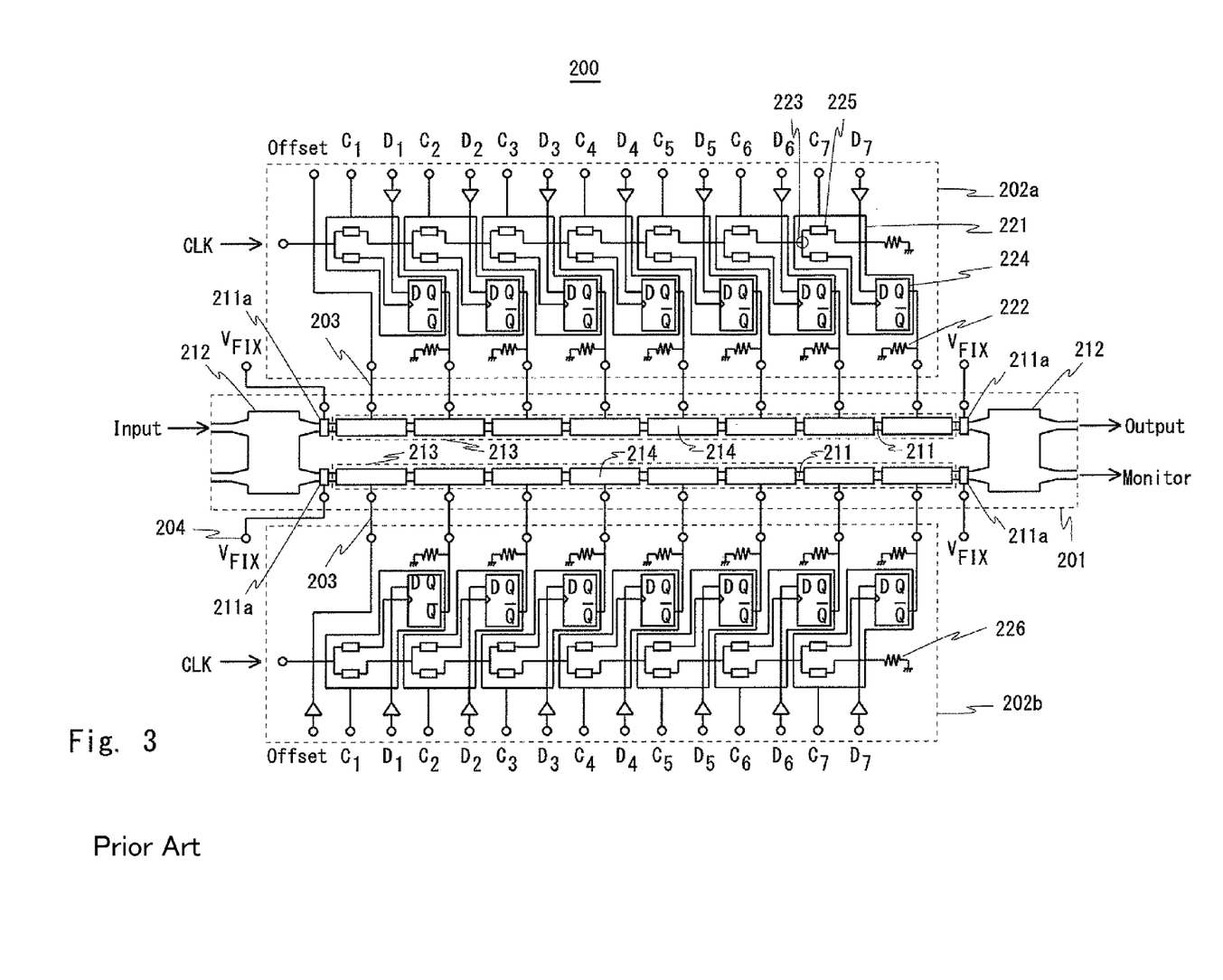
FIG. 3 is a block diagram of a digital segmented electrode structure multilevel optical modulator module 200 according to Patent Literature 1.

A digital segmented electrode structure multilevel optical modulator module 200 disclosed in Patent Literature 1 will be described below. FIG. 3 is a block diagram of the digital segmented electrode structure multilevel optical modulator module 200 according to Patent Literature 1. As shown in FIG. 3, the digital segmented electrode structure multilevel optical modulator module 200 includes a digital segmented electrode structure optical modulator 201 and integrated circuits 202a and 202b.

The digital segmented electrode structure optical modulator 201 has an MZ interferometer structure including two single-mode semiconductor optical waveguides 211 and a two-input/two-output optical multiplexer/demultiplexer 212. As shown in FIG. 3, a optical signal to be modulated Input is input from the left side, and an output signal Output and a monitor output Monitor are output from the right side. Each of the two semiconductor optical waveguides 211 serving as a pair of delay paths in the MZ interferometer is provided with a digital segmented electrode structure optical phase modulator 213.

Each of the semiconductor optical waveguides 211 includes a core layer and cladding layers that sandwich the core layer. In each of the semiconductor optical waveguides 211, an electric field can be applied to the core layer, or an electric current can be injected into the core layer, thereby enabling change of its refractive index which affects the optical signal propagating along the core layer. In each of the semiconductor optical waveguides 211, a laterally tapered spot size converter (not shown) is provided in the vicinity of both cleaved end faces of the digital segmented electrode structure optical modulator 1, and low reflection films (not shown) are formed at both cleaved faces.

The digital segmented electrode structure optical phase modulator 213 is segmented into n (n>2, n is an integer) waveguide-type optical phase modulator regions 214 to define small segments of the semiconductor optical waveguides 211. For example, the digital segmented electrode structure optical phase modulator 213 can be segmented into a power-of-two number, i.e., $n=2^h$ (h≥2, h is an integer), of waveguide-type optical phase modulator regions 214. FIG. 3 shows an example assuming h=3. The adjacent waveguide-type optical phase modulator regions 214 are electrically isolated from each other.

Each of the integrated circuits 202a and 202b includes m (m≤n, m is an integer) individual driving circuits 221 and m terminators 222. The configurations of the integrated circuits 202a and 202b have a mirror image relationship with respect to the digital segmented electrode structure optical modulator 201. FIG. 3 shows an example assuming $m=(2^h-1)$. Each of the individual driving circuits 221 is a circuit block including a branch 223, a driving circuit 224, and a phase shift circuit 225. The branch 223 is a one-input/two-output branch that divides an input clock signal CLK into two signals.

The driving circuit 224 outputs discriminated digital input signals $D_1$ to $D_7$ to the respective waveguide-type optical phase modulator regions 214 in synchronization with one of the divided clock signals CLK. An output stage of the driving circuit 224 has function of delaying, amplitude adjustment, bias adjustment, and waveform shaping. These functions can be controlled by external electric signals (signals $C_1$ to $C_7$ shown in FIG. 3). The functions of the driving circuit 224 can be implemented by applying a D-flip-flop circuit (D-FF circuit) as shown in FIG. 3, for example.

The phase shift circuit 225 outputs the other of the divided clock signals CLK to the subsequent-stage individual driving circuit 221. Similarly, the phase shift circuit 225 has functions of delay adjustment, amplitude adjustment, and waveform shaping. These functions can be controlled by external electric signals as in the driving circuit 224.

An offset signal Offset for adjusting an offset in the phase of the optical signal to be modulated is input to the first waveguide-type optical phase modulator region 214 counted from the input side. The signal output of the i-th ($2≤i≤m=2^h-1$, i is a natural number) individual driving circuit 221 counted from the input side and the (i+1)-th waveguide-type optical phase modulator region 214 are connected by a driving signal line 203.

A terminator 226 that terminates the clock signal transmitted through each of the individual driving circuits 221 is connected between a ground potential and the last-stage individual driving circuit 221 counted from the input side. A terminator 222 is connected between the corresponding driving signal line 203 and a common ground (not shown) to suppress a waveform distortion or degradation in bandwidth due to reflection of the signal output.

Semiconductor optical waveguides 211a that smoothly connect the optical multiplexer/demultiplexer 212 with the waveguide-type optical phase modulator regions 214 adjacent to the optical multiplexer/demultiplexer 212 are connected to potential clamp means 204 of a potential $V_{FIX}$. This allows the optical multiplexer/demultiplexer 212 and the semiconductor optical waveguides 211a to be connected to an external constant voltage source and kept at a constant potential regardless of the magnitude of the driving signal.

Next, the operation of the digital segmented electrode structure multilevel optical modulator module 200 will be described. The clock signal CLK input to the digital segmented electrode structure multilevel optical modulator module 200 is first divided into two parts at the branch 223. One of the divided clock signals CLK is guided to a clock signal input of each of the individual driving circuits 221. The individual driving circuits 221 discriminate the logic of each of the digital input signals $D_1$ to $D_7$ in synchronization with the divided clock signals CLK, and drive the waveguide-type optical phase modulator regions 214 according to the result.

The other of the divided clock signals CLK is guided to the subsequent-stage individual driving circuit 221 through the phase shift circuit 225. By repeating this, the $(2^h-1)$ individual driving circuits 221 can sequentially drive the respectively connected waveguide-type optical phase modulator regions 214.

Thus, when the modulated signal Input is input from the left side, the digital segmented electrode structure multilevel optical modulator module 200 can modulate the optical signal to be modulated.

CITATION LIST

Patent Literature

Patent Literature 1: International Patent Publication No. WO 2011/043079

Non Patent Literature

Non Patent Literature 1: Tomoaki Kato, and 4 others, "10-Gb/s-80-km operation of full C-band InP MZ modulator with linear-accelerator-type tiny in-line centipede electrode structure directly driven by logic IC of 90-nm CMOS process", OFC/NEOEC, 2011, ThP4.

Non Patent Literature 2: Tomoaki Kato, and 4 others, "InP MZ modulator with linear-accelerator-type tiny in-line centipede electrode structure for direct-drive with CMOS logic IC", 2011 IEICE General Conference, C-3-30

SUMMARY OF INVENTION

Technical Problem

However, the present inventor has found that the above-mentioned techniques have problems as described below. Integrated circuits of the MZ optical modulator are respectively disposed on and under the optical modulator along the light propagation direction of the optical modulator. Accordingly, as described above, the two integrated circuits have a mirror image relationship, or a symmetrical configuration, with respect to the optical modulator.

The layout of the two integrated circuits having a mirror image relationship depends on the direction in which the optical signal to be modulated is input to the optical modulator module. Specifically, as shown in FIG. 3, when the optical signal to be modulated is input from the left side of the optical modulator, the integrated circuit 202a is disposed on the upper side and the integrated circuit 202b is disposed on the lower side thereof. On the other hand, when the optical signal to be modulated is input from the right side of the optical modulator, the integrated circuit 202b should be disposed on the upper side and the integrated circuit 202a should be disposed on the lower side thereof.

In other words, if the input direction of the optical signal to be modulated is not determined depending on the system in which the digital segmented electrode structure multilevel optical modulator module 200 is mounted, for example, the positions where the two integrated circuits having a mirror image relationship are mounted are not determined. As a result, the operation in which the optical modulator and two integrated circuits are mounted on the substrate in advance and wiring is laid out is difficult in principle.

Two integrated circuits, which are used when the optical signal to be modulated is input from the left side, and two integrated circuits, which are used when the optical signal to be modulated is input from the right side, can be mounted on a substrate. However, considering that an increase in the number of integrated circuits results in an increase in the circuit size and manufacturing cost, this configuration is impractical.

In short, it is difficult for typical integrated circuits to deal with such a rational production process in which a unit including an optical modulator and two integrated circuits is prepared in advance regardless of the input direction of the optical signal to be modulated.

The present invention has been made in view of the above-mentioned problems, and an object of the present invention is to provide an optical modulator module, an integrated circuit for driving an optical modulator, and a method for modulating an optical signal, which can be mounted on an optical modulator module regardless of an input direction of a optical signal to be modulated and are capable of a high-speed modulation operation with a low driving voltage.

Solution to Problem

An optical modulator module according to an exemplary aspect of the present invention includes: an optical modulator that modulates an optical signal input from one end thereof; and an integrated circuit that controls a modulation operation of the optical modulator. The optical modulator includes: an optical waveguide that guides the optical signal; and at least m (2≤m, m is an integer) waveguide-type optical phase modulator regions arranged on the optical waveguide. The integrated circuit includes: two buffer circuits that are supplied with power separately from two buffer circuit power supply electrodes; a transmission line that is connected between outputs of the two buffer circuits and receives a synchronization signal through one of the two buffer circuits; two synchronization signal terminators having one ends respectively connected to both ends of the transmission line, and the other ends respectively connected to two synchronization signal terminator power supply electrodes; and m individual driving circuits that receive the synchronization signal from different positions of the transmission line. The transmission line receives the synchronization signal through the buffer circuit disposed on a side where the optical signal is input. An i (1≤i≤m, i is an integer)-th individual driving circuit counted from the side where the optical signal is input outputs a signal obtained by amplifying a digital input signal in synchronization with the synchronization signal to an i-th waveguide-type optical phase modulator region.

An integrated circuit for driving an optical modulator according to an exemplary aspect of the present invention includes: two buffer circuits that are supplied with power separately from two buffer circuit power supply electrodes; a transmission line that is connected between outputs of the two buffer circuits and receives a synchronization signal through one of the two buffer circuits; two synchronization signal terminators having one ends respectively connected to both ends of the transmission line, and the other ends respectively connected to two synchronization signal terminator power supply electrodes; and m (2≤m, m is an integer) individual driving circuits that receive the synchronization signal from different positions of the transmission line. The transmission line receives the synchronization signal through the buffer circuit disposed on a side where an optical signal is input. An i (1≤i≤m, i is an integer)-th individual driving circuit counted from the side where the optical signal is input outputs a signal obtained by amplifying a digital input signal in synchronization with the synchronization signal to an i-th waveguide-type optical phase modulator region among at least m waveguide-type optical phase modulator regions arranged on an optical waveguide that is formed in the optical modulator to guide the optical signal.

A method for modulating an optical signal according to an exemplary aspect of the present invention includes: inputting a synchronization signal to a transmission line through a buffer circuit disposed on a side where an optical signal is input, in two buffer circuits that are supplied with power separately from two buffer circuit power supply electrodes, the transmission line being connected between outputs of the two buffer circuits; inputting the synchronization signal to m (2≤m, m is an integer) individual driving circuits from different positions of the transmission line; and outputting, by an i (1≤i≤m, i is an integer)-th individual driving circuit counted from the side where the optical signal is input, a signal obtained by amplifying a digital input signal in synchronization with the synchronization signal to an i-th waveguide-type optical phase modulator region among at least m waveguide-type optical phase modulator regions arranged on an optical waveguide that is formed in an optical modulator to guide the optical signal, both ends of the transmission line being connected to two synchronization signal terminator power supply electrodes through two synchronization signal terminators, respectively.

Advantageous Effects of Invention

According to the present invention, it is possible to provide an optical modulator module, an integrated circuit for driving an optical modulator, and a method for modulating an optical signal, which can be mounted on an optical modulator module regardless of an input direction of an optical signal to be modulated and are capable of high-speed modulation operation with a low driving voltage.

DESCRIPTION OF EMBODIMENTS

Hereinafter, exemplary embodiments of the present invention will be described with reference to the drawings. In the drawings, the same elements are denoted by the same reference numerals, and a repeated explanation thereof is omitted as needed.

First Exemplary Embodiment

Figure 1:
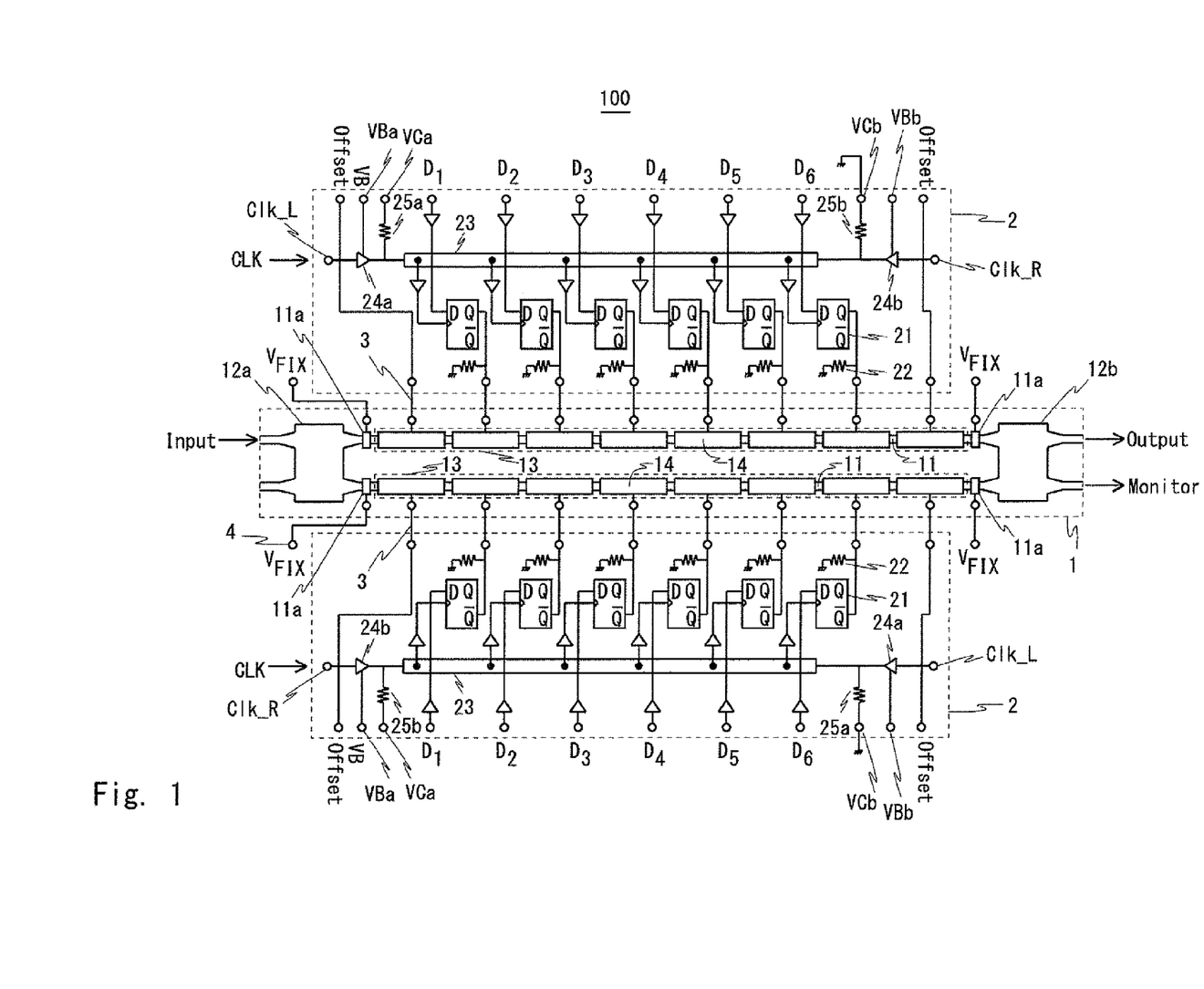
FIG. 1 is a block diagram of a linear accelerator-type column electrode structure MZ optical modulator module 100 according to a first exemplary embodiment.

First, a linear accelerator-type column electrode structure MZ optical modulator module 100 according to a first exemplary embodiment of the present invention will be described. The linear accelerator-type column electrode structure MZ optical modulator module 100 is an optical modulator module that performs optical intensity modulation. FIG. 1 is a block diagram of the linear accelerator-type column electrode structure MZ optical modulator module 100 according to the first exemplary embodiment. The configuration of the linear accelerator-type column electrode structure MZ optical modulator module 100 will be described below with reference to the drawings. As shown in FIG. 1, the linear accelerator-type column electrode structure MZ optical modulator module 100 includes a linear accelerator-type column electrode structure MZ optical modulator 1 and two integrated circuits 2. The integrated circuits 2 are integrated circuits for driving the optical modulator. Each of the integrated circuits controls the modulation operation of the linear accelerator-type column electrode structure MZ optical modulator 1.

The linear accelerator-type column electrode structure MZ optical modulator 1 has an MZ interferometer structure including two single-mode semiconductor optical waveguides 11 and two-input/two-output optical multiplexers/demultiplexers 12a and 12b. The two semiconductor optical waveguides 11 function as a pair of delay paths in the MZ interferometer. The linear accelerator-type column electrode structure MZ optical modulator 1 can receive optical signals to be modulated from both right and left ends thereof. FIG. 1 shows a case where an optical signal to be modulated is input from the left end.

As shown in FIG. 1, the optical signal to be modulated input to the left end (in the vicinity of Input shown in FIG. 1) of the linear accelerator-type column electrode structure MZ optical modulator 1 is branched into two signals by the optical multiplexer/demultiplexer 12a. The two signals are guided to the two semiconductor optical waveguides 11, respectively. Each of the semiconductor optical waveguides 11 is provided with a linear accelerator-type column electrode structure optical phase modulator 13. When passing through the linear accelerator-type column electrode structure optical phase modulator 13, the optical signal to be modulated undergoes an optical phase variation depending on an applied voltage. The optical signal to be modulated is subjected to multiplexing and interference by the optical multiplexer/demultiplexer 12b, and is output from the right end (in the vicinity of Output and Monitor shown in FIG. 1) of the linear accelerator-type column electrode structure MZ optical modulator 1.

Each of the semiconductor optical waveguides 11 includes a core layer and cladding layers (neither layer is not shown) which sandwich the core layer. In each of the semiconductor optical waveguides 11, an electric field can be applied to the core layer, or an electric current can be injected into the core layer, thereby enabling change of its refractive index which affects the optical signal propagating along the core layer. In each of the semiconductor optical waveguides 11, a laterally tapered spot size converter (not shown) is provided in the vicinity of both cleaved end faces of the linear accelerator-type column electrode structure MZ optical modulator 1, and low reflection films (not shown) are formed at the both cleaved faces.

Semiconductor optical waveguides 11a which smoothly connect the optical multiplexers/demultiplexers 12a and 12b with waveguide-type optical phase modulator regions 14 adjacent to the optical multiplexers/demultiplexers 12a and 12b are connected to potential clamp means 4 of a potential $V_{FIX}$. This allows the optical multiplexers/demultiplexers 12a and 12b and the semiconductor optical waveguides 11a to be connected to an external constant voltage source and kept at a constant potential regardless of the magnitude of the driving signal. This is because a phenomenon can be prevented in which the optical multiplexers/demultiplexers 12a and 12b and the semiconductor optical waveguides 11a contribute to optical modulation due to leakage of the modulating signal component to the optical multiplexers/demultiplexers 12a and 12b and the semiconductor optical waveguide 11a, resulting in an increase in modulation frequency response especially in a low-frequency region.

The linear accelerator-type column electrode structure optical phase modulator 13 has a configuration in which n (n is an integer that satisfies n≥2) waveguide-type optical phase modulator regions 14 are connected in cascade to define small segments of the semiconductor optical waveguides 11. For example, the linear accelerator-type column electrode structure optical phase modulator 13 can be segmented into a power-of-two number, i.e., $n=2^h$ (h is an integer that satisfies h≥2), of waveguide-type optical phase modulator regions 14. FIG. 1 shows an example assuming h=3. The adjacent waveguide-type optical phase modulator regions 14 are formed by ion implantation of an element (for example, a III-V compound semiconductor such as helium or titanium), which inhibits electrical conductivity of the semiconductor, and serve as insulating regions.

On both sides, which are in parallel with an optical signal propagation axis, of the linear accelerator-type column electrode structure MZ optical modulator 1, two integrated circuits are disposed so as to be substantially in contact with the linear accelerator-type column electrode structure MZ optical modulator 1.

Each of the integrated circuits 2 includes m (m is an integer that satisfies m≤n) individual driving circuits 21 and m terminators 22, a transmission line 23, clock buffer circuits 24a and 24b, and clock terminators 25a and 25b. FIG. 1 shows an example assuming $m=(2^h-2)$. The first and $2^h$-th waveguide-type optical phase modulator regions 14 counted from the input side receive an offset signal Offset for adjusting an offset in the phase of the optical signal to be modulated. An output Q of the (i−1)-th (i is an integer that satisfies $2≤i≤m=2^h-2$) individual driving circuit 21 counted from the input side and the i-th waveguide-type optical phase modulator region 14 are connected by a driving signal line 3.

An input of the clock buffer circuit 24a is connected to a clock signal electrode Clk_L, and an output of the clock buffer circuit 24a is connected to the left end of the transmission line 23. A power supply of the clock buffer circuit 24a is supplied from an external power supply VB through a clock buffer circuit power supply electrode VBa which is a dedicated power supply electrode isolated from power supplies of other circuit elements of the integrated circuit 2. One end of the clock terminator 25a is connected to the left end of the transmission line 23, and the other end of the clock terminator 25a is connected to a clock terminator power supply electrode VCa. Since the optical signal to be modulated is input from the left side in this example, the clock terminator power supply electrode VCa is open so as to prevent the clock terminator 25a on a light input side from functioning as the terminator of the transmission line 23.

An input of the clock buffer circuit 24b is connected to a clock signal electrode Clk_R, and an output of the clock buffer circuit 24b is connected to the right end of the transmission line 23. A power supply of the clock buffer circuit 24b is connected to a clock buffer circuit power supply electrode VBb which is a dedicated power supply electrode isolated from power supplies of other circuit elements of the integrated circuit 2. In this exemplary embodiment, the clock buffer circuit power supply electrode VBb is open. One end of the clock terminator 25b is connected to the right end of the transmission line 23, and the other end of the clock terminator 25b is connected to a clock terminator power supply electrode VCb. Since the optical signal to be modulated is input from the left side in this example, the clock terminator power supply electrode VCb is pulled up to a predetermined potential so that the clock terminator 25b on the light input side functions as the terminator of the transmission line 23. Referring to FIG. 1, the clock terminator power supply electrode VCb is connected to a ground potential.

In this exemplary embodiment, a clock signal CLK is input to the clock signal electrode Clk_L on the light input side. On the other hand, the clock signal electrode Clk_R on the optical output side is open or terminated. As described above, the power supply electrode of the clock buffer circuit on the optical output side is open. Therefore, the impedance of the clock buffer circuit 24b expected from the transmission line 23 is high, and thus the clock buffer circuit 24b can be regarded to be in a substantially open state in actual use.

Digital input signals $D_1$ to $D_6$ are respectively input to inputs D of the individual driving circuits 21 through buffers. Outputs Q of the individual driving circuits 21 are connected to the respective driving signal lines 3. Each terminator 22 is connected between the corresponding driving signal line 3 and a common ground to suppress a waveform distortion or degradation in bandwidth due to reflection of the signal output. Note that the impedance of each terminator 22 is matched with the output impedance of the connected individual driving circuit 21. The individual driving circuits 21 also receive the clock signal CLK through the transmission line 23 and buffers.

Next, the operation of the linear accelerator-type column electrode structure MZ optical modulator module 100 will be described. The case where the optical signal to be modulated is input from the left side of FIG. 1 will be described below. In the two integrated circuits 2 of the linear accelerator-type column electrode structure MZ optical modulator module 100, the clock signals CLK having the same phase are input to the clock signal electrodes Clk_L on the light input side. Each clock signal CLK is amplified and subjected to waveform shaping in the clock buffer circuit 24a and is then guided to the transmission line 23.

In the individual driving circuits 21, buffer circuits having high input impedance are shunt-connected at certain intervals. Thus, the discriminated digital input signals $D_1$ to $D_6$ are output to the respective waveguide-type optical phase modulator regions 14 in synchronization with the clock signal component which is tapped at a certain ratio from the transmission line 23. For example, signals having the same amplitude are output from the individual driving circuits 21 to the waveguide-type optical phase modulator regions 14.

To achieve pseudo phase velocity matching between a optical signal to be modulated and a modulation electric signal, it is necessary to set a time difference between clock signals, which are respectively supplied to the adjacent individual driving circuits 21, to be equal to a time required for the optical signal to be modulated to pass through one stage of the short waveguide-type optical phase modulator regions 14. The transmission line 23 functions so as to generate a signal as a reference for the time required for sequentially delaying and driving the m individual driving circuits 21. In this exemplary embodiment, to facilitate the layout of the integrated circuits 2, the interval of tapping the clock signal component from the transmission line 23 is set to be equal to the distance between the adjacent waveguide-type optical phase modulator regions 14. In association with this, the structure parameter of the transmission line 23 is set such that a time required for the optical signal to be modulated to pass through one stage, or the distance between the centers of the adjacent waveguide-type optical phase modulator regions 14, becomes equal to a time required for a primary transmission mode propagating along the transmission line 23 to pass through the above-mentioned tapping interval.

Such a contrivance for pseudo phase velocity matching can eliminate one of the inconsistent constraints in terms of the layered structure design of the waveguide-type optical modulator, that is, the phase velocity matching and the impedance matching. This results in enhancing the degree of freedom of design in designing the waveguide from the viewpoint of optical characteristics rather than from that of the phase velocity/impedance matching.

Though the phase velocity of the basic transmission mode propagating along the transmission line 23 depends on the cross-section structure of the transmission line, the phase velocity is approximately equal to a value obtained by dividing a velocity of light by an effective relative refractive index. Since the transmission line 23 itself is a passive element, the phase velocity thereof is hardly affected by the actual use environment, such as temperature. Accordingly, when the layout design for the length of the transmission line 23 serving as a phase shift circuit is performed with a precision of 0.1 µm, a variation in the delay time can be suppressed within about 1 fsec. This is about two orders of magnitude smaller than that of a variation in the operation speed of an active circuit element, and is small enough to be practically negligible.

The propagation speed (delay time) of the transmission line 23 itself cannot be electrically controlled. However, it can be expected that the effects of the propagation speed (delay time) can be suppressed to be small enough to be practically negligible. In case the phase velocity of the basic propagation mode in the transmission line 23 deviates from a desired value depending on the operating temperature and variations due to manufacturing processes, for example, a mechanism for electrically compensating for a delay of the clock signal is practical. As means to achieve this, a voltage variable phase shifter may be configured by applying a phase interpolator, for example, to electrically control the phase of the clock signal CLK. It is obvious that such a phase interpolator can be monolithically integrated on the same semiconductor substrate as the driving circuit.

An output stage of the individual driving circuits 21 has functions of delay adjustment, amplitude adjustment, bias adjustment, and waveform shaping. These functions can be controlled by electric signals supplied from the outside of the integrated circuit. These functions can be implemented by adding a functional circuit using a D-flip-flop circuit (D-FF circuit) as a base of the driving circuit, for example.

In this configuration, the individual driving circuits 21 are respectively provided to the plurality of waveguide-type optical phase modulator regions 14. This results in overcoming a problem that the amplitude of the modulation electric signal decreases toward the back end of the entire optical phase modulator region, which is a concern in the existing optical modulator, particularly when the modulation frequency is high. Accordingly, a number of stages of waveguide-type optical phase modulator regions can be connected in cascade within the allowable range of the attenuation of the optical signal to be modulated in the system configuration. This leads to an increase in the effective optical modulator length beyond the limitation of the effective optical modulator length $1/\alpha_m$ of a typical traveling-wave type modulator.

Furthermore, the optical modulation degree per stage of the short waveguide-type optical phase modulator regions 14 can be suppressed to a relatively small degree, resulting in lowering the driving voltage. This eliminates the need for a driving circuit having a large output amplitude, which is hardly compatible with the broadband and which poses many problems in terms of reliability. This leads to suppression of the output current of each transistor used at the output stage of each of the individual driving circuits to a relatively small amount, which is advantageous in terms of improvement in operation speed, suppression of distortion of a driving signal waveform, and improvement in reliability.

When the waveguide-type optical phase modulator regions 14, which are reduced in length as described above, have a small capacitance and are each regarded as a lumped-constant circuit element (lumped-constant type optical modulator) and when the lines connecting the individual driving circuits 21 and the waveguide-type optical phase modulator regions 14 are sufficiently shorter than a propagating wavelength at a frequency of a modulation electric signal, the degree of freedom of each of the resistance values of the termination resistor and the formation position thereof can be increased.

As for the resistance value of the termination resistor, for example, if the required frequency band is 50 GHz and the frequency band estimated from a CR product at a termination of 50Ω can be set to 100 GHz, which is a value twice as large as the required value, when the resistance value of the terminator is doubled, i.e., 100Ω, the output voltage amplitude can be doubled assuming that the output current from the output-stage transistor of each driving circuit is kept at the same level.

Further, if the output voltage amplitude is kept at a certain level, the drive current can be suppressed by ½. In the former case, a reduction in the operation current density of the output-stage transistors leads to a high reliability. In the latter case, miniaturization of the output-stage transistors leads to a high-speed operation due to a reduction in element capacitance, and the margin of the operation speed can also be applied to one of these transistors. Furthermore, a Joule loss (that is, heat generation) in the terminator is in proportion to a square of a drive current and a resistance. Accordingly, when the drive current is reduced by half, the calorific value can be suppressed by ½. Obviously, this is favorable in terms of the reliability of the elements forming the driving circuit. Moreover, a mode can be implemented in which a terminator is directly formed on a driving IC or an optical modulator (a so-called on-chip terminal), which is advantageous in terms of improvement in high-frequency characteristics but cannot be conventionally adopted because of a concern about temperature characteristics. On the other hand, the terminator can be effectively treated as a lumped-constant circuit element. Accordingly, even when the terminator is disposed on the individual driving circuit or the optical modulator or in the middle of these circuits, the effect of this location on the frequency response characteristic can be suppressed to a level low enough to be practically negligible. As a result, the degree of freedom of the module implementation form can be increased in terms of circuit configuration.

Whether or not to perform optical phase modulation in the i-th waveguide-type optical phase modulator region 14 counted from the input side, for example, is designated by a digital input signal D, which is input to the i-th individual driving circuit 21 connected to the i-th waveguide-type optical phase modulator region 14. In this case, assuming that the waveguide-type optical phase modulator regions 14 have the same length and the amount of phase shift received by the optical signal to be modulated in each of the waveguide-type optical phase modulator regions 14 is the same, the total amount of phase shift received by the optical signal to be modulated is in proportion to the number of the waveguide-type optical phase modulator regions 14 designated to perform optical phase modulation by the digital input signal $D_i$.

When $2^{(k-1)}$ individual driving circuits 21 are driven in groups using the same logic by a k (k is an integer that satisfies $1 \leq k \leq n$)-th digital input signal $D_k$, the total phase shift amount of the optical signal to be modulated can be discretely designated by (n−1) digital input signals. This enables implementation of a function equivalent to the replacement of an analog electric signal output with an optical phase in a digital-to-analog converter.

As in the linear accelerator-type column electrode structure MZ optical modulator module 100, $2^{2n}$ combinations of complex amplitudes of optical signals to be modulated can be designated in the configuration in which the above-mentioned linear accelerator-type column electrode structure optical phase modulator 13 is formed in each one of a pair of delay paths in the MZ interferometer. According to this configuration, multilevel optical modulation using a digital signal can be achieved without directly applying an analog electric signal. For example, an offset in the phase shift amount can be adjusted by applying a separate voltage signal to the electrodes of the waveguide-type optical phase modulator regions 14, which need not be driven, as in the first waveguide-type optical phase modulator region 14 counted from the input side of FIG. 1.

When each of the electrodes (optical modulator regions) connected in cascade can be regarded as a lumped-constant circuit element (lumped-constant type optical modulator), a measure of the modulation frequency band thereof is generally given by the product (CR product) of the capacitance of each optical modulator region and the resistance of the terminator. According to the present invention, this capacitance decreases substantially in inverse proportion to the number of the segmented regions. Therefore, a modulation frequency band of more than 100 GHz can be relatively easily achieved in each of the segmented optical modulator regions, which is advantageous in terms of a high-speed operation.

Furthermore, as described above, a reduction in driving voltage amplitude can be achieved, thereby enabling production of a driving circuit using a semiconductor process technology, which has a low voltage amplitude but is excellent in mass production, high uniformity, and high integration of CMOS-IC (Complementary Metal Oxide Semiconductor-Integrated Circuit), SiGe-HBT (Heterojunction Bipolar Transistor)-IC, and the like. Therefore, the present invention is advantageous in terms of a smaller size, lower cost, lower power consumption, and the like, as compared to the case of using the existing driving circuit which is based on a III-V compound semiconductor such as GaAs or InP and which has a higher driving voltage and is inferior in mass production and high integration while achieving a high-speed operation. Moreover, light source elements can be highly integrated to reduce the number of components, which leads to a further reduction in cost.

Additionally, a reduction in driving voltage amplitude according to this configuration enables operation in a (more linear) region with a relatively small variation in non-linear (complex) refractive index with respect to an applied electric field as indicated by phenomena such as the Franz-Keldysh effect and quantum confined Stark effect which are basic modulation principles for semiconductor optical modulators. Accordingly, characteristics comparable to those of the LN-based optical modulator can be achieved even in the case of using a semiconductor optical modulator element based on a compound semiconductor which is regarded as being disadvantageous in terms of larger frequency chirping than that of the LN-based optical modulator and optical fiber transmission characteristics.

The case where the optical signal to be modulated is input to the left end of the linear accelerator-type column electrode structure MZ optical modulator 1 has been described above. However, the linear accelerator-type column electrode structure MZ optical modulator module 100 is also applicable to the case where the optical signal to be modulated is input to the right end of the linear accelerator-type column electrode structure MZ optical modulator 1. The use of the linear accelerator-type column electrode structure MZ optical modulator module 100 is adaptable to the input of the optical signal to be modulated from both ends, by only changing the connection between the clock buffer circuit power supply electrodes VBa and VBb and the connection between the clock terminator power supply electrodes VCa and VCb.

As described above, when the optical signal to be modulated is input to the left end of the linear accelerator-type column electrode structure MZ optical modulator 1, the clock buffer circuit power supply electrode VBa is connected to the external power supply VB, and the clock buffer circuit power supply electrode VBb is open. The clock terminator power supply electrode VCa is open, and the clock terminator power supply electrode VCb is connected to the GND potential.

Figure 2:
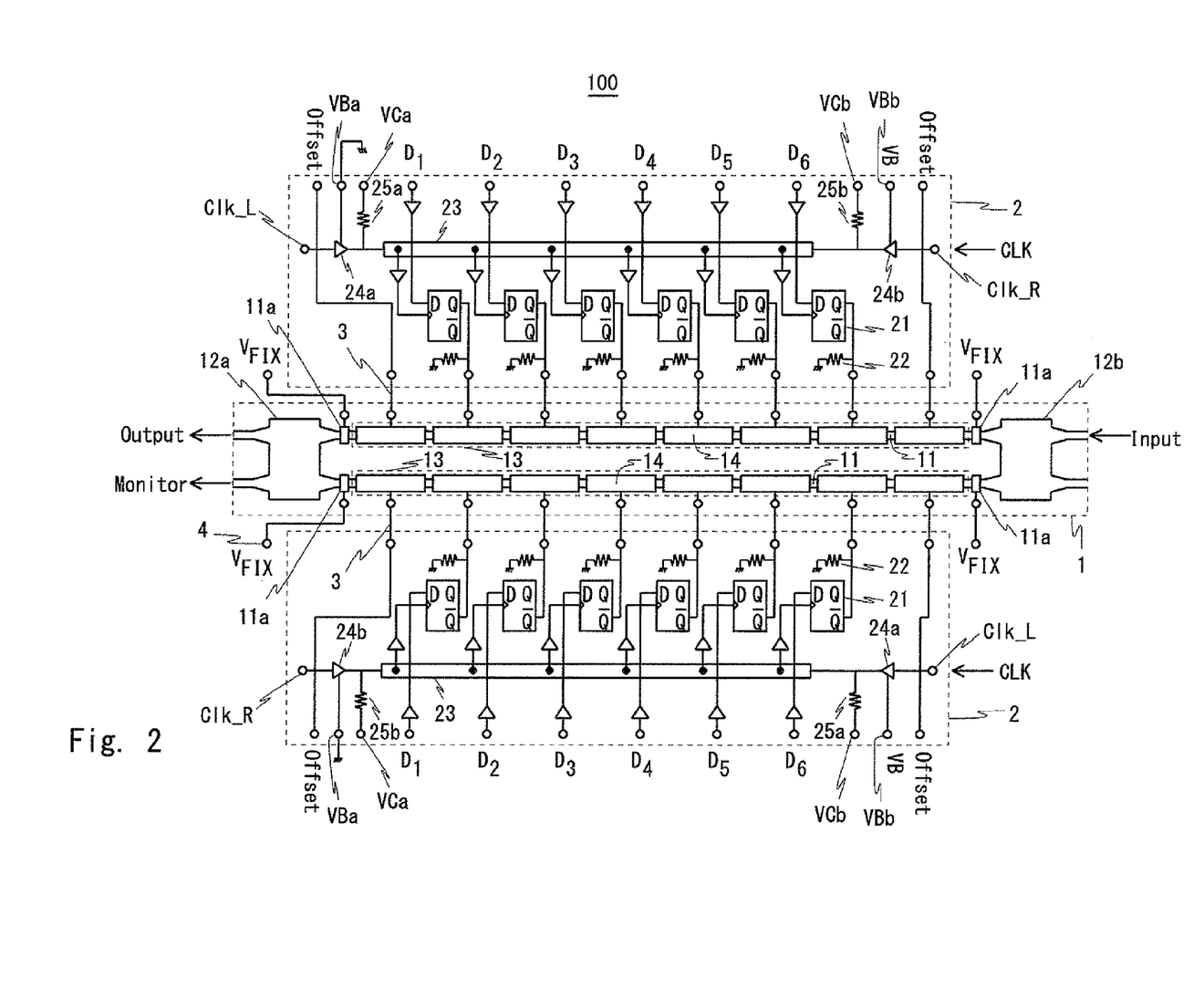
FIG. 2 is a bock diagram of the linear accelerator-type column electrode structure MZ optical modulator module 100 when a optical signal to be modulated is input to a right end.

On the other hand, when the optical signal to be modulated is input to the right end of the linear accelerator-type column electrode structure MZ optical modulator 1, the clock buffer circuit power supply electrode VBa is open, and the clock buffer circuit power supply electrode VBb is connected to the external power supply VB. The clock terminator power supply electrode VCa is connected to the ground potential, and the clock terminator power supply electrode VCb is open. FIG. 2 is a block diagram of the linear accelerator-type column electrode structure MZ optical modulator module 100 when the optical signal to be modulated is input to the right end thereof. In this configuration, even when the optical signal to be modulated is input to the right end of the linear accelerator-type column electrode structure MZ optical modulator 1, optical modulation can be performed in the same manner as in the case where the optical signal to be modulated is input to the left end thereof.

In other words, this configuration can be applied to both the case where the optical signal to be modulated is input to the right end of the linear accelerator-type column electrode structure MZ optical modulator 1 and the case where it is input to the left end thereof. The input direction of the optical signal to be modulated can be switched by only changing the state in which the integrated circuit 2 is connected to the external power supply. Specifically, the input direction can be easily switched only depending on the presence or absence of connection of electrode lines, such as wire bonding or bump mounting, during mounting of the integrated circuit, for example.

As means for selecting only a desired circuit in the actual use while providing such a redundancy to the circuit configuration in advance, laser trimming of lines within an IC, circuit reconfiguration of a programmable gate array, or the like may be employed as an option. However, as far as the optical modulator module of the present invention is concerned, it is obvious that the selection of such a specific function is actually required only at the time of assembling a module, and after that (during use), there is no need to change any function. Therefore, it can be said that the method of selecting a function depending only on the presence or absence of an electrode line (for example, wire bonding or bump mounting) during assembly of a module is practical.

The integrated circuit that sequentially synchronizes and drives N individual driving circuits in the right and left directions can be achieved with an extremely small circuit size, i.e., a circuit including one transmission line, two clock buffer circuits, and two pairs of clock terminators. Specifically, the integrated circuit can be achieved by only adding one clock buffer circuit and one clock terminator to a typical integrated circuit capable of sequentially synchronizing and driving a group of individual driving circuits in only one direction; incorporating one electrode for clock signal input, two electrodes for buffer circuit power supply, and two electrodes for terminator power supply; and modifying the layout of the electrodes. This configuration is adaptable to sequential synchronization and driving in the right and left directions. An increase in the chip area of the integrated circuit in association with the addition of these components is small, so the effect on the yield and cost of the integrated circuit is negligibly small.

The power consumption of the circuit that sequentially synchronizes and drives a group of individual driving circuits in the right and left directions is basically the same as the power consumption of a typical integrated circuit capable of sequentially synchronizing and driving individual driving circuits in only one direction. This is because only one of the two clock buffer circuits and one of the two clock terminators are connected to the power supply and no current flows through the elements that are not connected to the power supply.

As described above, according to this configuration, the employment of the integrated circuit adaptable to sequential delaying and driving in both directions of the linear accelerator-type column electrode structure MZ optical modulator enables integration into one common type integrated circuit for driving, regardless of which one of two sides, which are in parallel with the propagation axis of the optical signal to be modulated, the integrated circuit for driving is disposed on. This makes it possible to combine an optical modulator and an integrated circuit and integrate them on a substrate, regardless of the input direction of the optical signal to be modulated.

In the actual use of the integrated circuit that achieves sequential delaying and driving in both directions, the direction of sequential delaying and driving can be easily switched by only connecting a specific electrode to an external power supply or disconnecting it therefrom as described above during mounting and wiring of the integrated circuit. Accordingly, it can be expected that the cost of the integrated circuit for driving can be halved as compared with the case where two types of integrated circuits for driving, which have a mirror image relationship, need to be prepared.

In this configuration, there is no need to change the waveguide-type optical phase modulator region of the linear accelerator-type column electrode structure MZ optical modulator, and the pseudo travelling-wave operation, which is one of the largest characteristics, can be directly used. Therefore, this configuration can overcome the problem of the saturation of optical modulation efficiency during high-speed optical modulation, which is inherent in traveling-wave type optical modulators.

Similarly, this configuration enables each parasitic capacitance to be reduced to about 1/n by segmenting the waveguide-type optical phase modulator region into n regions. This drastically improves the modulation bandwidth per stage of the waveguide-type optical phase modulator regions, which is advantageous for high-speed optical modulation. In this configuration, the problem of a loss in the modulation electric signal in each of the segmented waveguide-type optical phase modulator regions is practically negligible. For this reason, the overall length of the phase modulator regions contributing to the optical (phase) modulation as described above can be increased. Accordingly, in inverse proportion to this, the driving voltage required to obtain the amount of phase shift per stage that is received by each waveguide-type optical phase modulator region can be reduced, which is advantageous for low-voltage driving.

As in the linear accelerator-type column electrode structure MZ optical modulator module 100, the optical phase modulator incorporating the linear accelerator-type column electrode structure optical phase modulator can achieve the function of applying a certain discrete phase shift to an optical signal passing therethrough by digital control, but cannot control the absolute value of the optical signal amplitude directly. In this case, the use of a linear accelerator-type column electrode structure MZ multilevel optical modulator, in which segmented electrode structure optical phase modulators are respectively incorporated in a pair of delay paths in an MZ interferometer, enables generation of any complex light amplitude within a circle having a radius of "1" on a complex plane. When an I-Q optical modulator is configured to perform I-Q quadrature modulation (I: In-Phase, Q: Quadrature-Phase), which is widely used in radio communications and the like, on light, a pair of linear accelerator-type column electrode structure MZ multilevel optical modulators may be prepared and a optical signal to be modulated output from a light source may be branched into two signals to be subjected to optical modulation using I-channel and Q-channel modulation electric signals. Each modulated optical signal may be multiplexed with a phase difference of $\pi/4$.

First Example

Next, a first example according to the present invention will be described. The first example is an example of operation verification of the linear accelerator-type column electrode structure MZ optical modulator module 100 according to the first exemplary embodiment. In this example, the semiconductor optical waveguides 11 of the linear accelerator-type column electrode structure MZ optical modulator 1 are formed on an Fe-doped InP semi-insulating substrate (not shown). A core layer and cladding layers that sandwich the core layer are formed on the Fe-doped InP semi-insulating substrate. The core layer is formed of a multi-quantum well layer and light confining layers formed on and under the multi-quantum well layer, and has a so-called separate confinement heterostructure (each of which layers is not shown). The multi-quantum well layer is an undoped AlGaInAs multi-quantum well layer having a well layer number of 12, a well layer thickness of 10 nm, a barrier layer thickness of 6 nm, and a transition wavelength of 1380 nm. The light confining layers are undoped InGaAsP light confining layers each having a wavelength composition of 1300 nm and a thickness of 25 nm. The cladding layers are made of p-type and n-type InP. The semiconductor optical waveguides 11 have such properties that the (complex) refractive index which affects an optical signal of a 1550 nm band propagating therethrough is changed due to the quantum confined Stark effect, when an electric field is applied to the multi-quantum well layer. Each of the optical multiplexers/demultiplexers 12a and 12b is a two-input/two-output MMI (Multi Mode Interference) multiplexer/demultiplexer having a layered structure similar to that of the semiconductor optical waveguides 11.

The individual driving circuits 21 are monolithically integrated on a semiconductor substrate by a CMOS process. Each of the individual driving circuits 21 can operate in accordance with the clock signal CLK of more than 50 Gb/s. The two integrated circuits 2 have the same configuration. The clock buffer circuit power supply electrodes and clock terminator electrodes are appropriately wired depending on the positions in which they are disposed so as to be adaptable to sequential delaying and driving in the direction identical with the propagation direction of the optical signal to be modulated. The driving signal lines 3 are each formed of a strip line, and have a characteristic impedance of 50Ω. The resistance value of each terminator 22 is 50 Ω.

In each of the waveguide-type optical phase modulator regions 14, the series resistance was 5Ω and the element capacitance was 0.07 pF or less. The frequency response band of a single waveguide-type optical phase modulator region was 55 GHz. Note that the waveguide-type optical phase modulator regions 14 which need not be driven were used to adjust the offset in the phase shift amount by applying a separate voltage signal to the electrodes thereof. Each of the waveguide-type optical phase modulator regions 14 was driven by an electric signal having an amplitude of 0.7 Vpp, so that a phase variation of $\pi/16$ could be applied to a optical signal to be modulated with a wavelength of 1550 nm which was incident in a TE (Transverse Electric) basic mode.

Further, the delay in the transmission line 23 was adjusted to match the time required for the optical signal to be modulated to pass through one stage of the waveguide-type optical phase modulator regions 14 with the time required for the clock signal to pass through one stage of the individual driving circuits 21. Thus, a pseudo traveling wave operation with an effective modulation frequency response band exceeding 50 GHz was achieved. As a result, practical 50 Gb/s-NRZ (Non Return to Zero) optical modulation characteristics having a satisfactory eye aperture were achieved by this configuration.

Other Exemplary Embodiment

Note that the present invention is not limited to the above exemplary embodiments, but can be modified as needed without departing from the scope of the invention. For example, the number of waveguide-type optical phase modulators to be installed is not limited to that of the above exemplary embodiments and examples. An arbitrary number of waveguide-type optical phase modulators may be used.

For example, each of the driving signal lines 3 may be directly mounted on an IC using a gold (Au) bump, instead of using a strip line. The individual driving circuits 21 of the integrated circuits 2 can be monolithically integrated on a semiconductor substrate. Further, the individual driving circuits 21 and the terminators 22 can be monolithically integrated on a semiconductor substrate. Moreover, the terminators 22 and the linear accelerator-type column electrode structure MZ optical modulator 1 can be monolithically integrated on a semiconductor substrate.

In the present invention, the voltage amplitude for driving each waveguide-type optical phase modulator region can be suppressed to a low level by increasing the number of the segmented regions. Accordingly, a terminator may be formed on the same semiconductor substrate together with the individual driving circuits. Further, the present invention may be produced using a silicon (Si) optical waveguide as a base, instead of using a compound semiconductor. Furthermore, in this case, driving circuits and optical modulators may be monolithically integrated on the same semiconductor substrate. Similarly, the present invention is also applicable to waveguide-type multilevel optical modulators produced using an electro-optic crystal, an organic compound, or the like having a Pockels effect or a higher electro-optical effect, as typified by LN described above, as a substrate. This is advantageous when a change in refractive index with respect to an applied voltage amplitude is larger than that in the above-mentioned semiconductor.

The whole or part of the exemplary embodiments disclosed above can be described as, but not limited to, the following supplementary notes.

(Supplementary note 1) An optical modulator module comprising:
an optical modulator that modulates an optical signal input from one end thereof; and
an integrated circuit that controls a modulation operation of the optical modulator, wherein
the optical modulator comprises:
an optical waveguide that guides the optical signal; and
at least m (2≤m, m is an integer) waveguide-type optical phase modulator regions arranged on the optical waveguide,
the integrated circuit comprises:
two buffer circuits that are supplied with power separately from two buffer circuit power supply electrodes;
a transmission line that is connected between outputs of the two buffer circuits and receives a synchronization signal through one of the two buffer circuits;
two synchronization signal terminators having one ends respectively connected to both ends of the transmission line, and the other ends respectively connected to two synchronization signal terminator power supply electrodes; and
m individual driving circuits that receive the synchronization signal from different positions of the transmission line,
the transmission line receives the synchronization signal through the buffer circuit disposed on a side where the optical signal is input, and
an i (1≤i≤m, i is an integer)-th individual driving circuit counted from the side where the optical signal is input outputs a signal obtained by amplifying a digital input signal in synchronization with the synchronization signal to an i-th waveguide-type optical phase modulator region.

(Supplementary note 2) The optical modulator module according to Supplementary note 1, wherein
the buffer circuit disposed on a side where the synchronization signal is input is supplied with a fixed voltage through one of the buffer circuit power supply electrodes,
the other buffer circuit power supply electrode connected to the other buffer circuit is open,
the one buffer circuit power supply electrode connected to the synchronization signal terminator disposed on the side where the synchronization signal is input is open, and
the other synchronization signal terminator is connected to a fixed potential through the other synchronization signal terminator power supply electrode.

(Supplementary note 3) The optical modulator module according to Supplementary note 1 or 2, wherein driving voltages having the same amplitude are respectively applied to the waveguide-type optical phase modulator regions.

(Supplementary note 4) The optical modulator module according to any one of Supplementary notes 1 to 3, wherein the waveguide-type optical phase modulator regions are obtained by applying the Franz=Keldysh effect or quantum confined Stark effect in a semiconductor, or Pockels effect in an electro-optic crystal.

(Supplementary note 5) The optical modulator module according to any one of Supplementary notes 1 to 4, further comprising:
m driving signal lines that connect the waveguide-type optical phase modulator regions with the individual driving circuits; and
m terminators connected between a ground potential and each of the m driving signal lines.

(Supplementary note 6) The optical modulator module according to any one of Supplementary notes 1 to 5, wherein the m individual driving circuits are monolithically integrated on a semiconductor substrate.

(Supplementary note 7) The optical modulator module according to Supplementary note 5, wherein the m individual driving circuits and the m terminators are monolithically integrated on a semiconductor substrate.

(Supplementary note 8) The optical modulator module according to Supplementary note 5 or 7, wherein the optical modulator and the m terminators are monolithically integrated on a semiconductor substrate.

(Supplementary note 9) An integrated circuit for driving an optical modulator, comprising:
two buffer circuits that are supplied with power separately from two buffer circuit power supply electrodes;
a transmission line that is connected between outputs of the two buffer circuits and receives a synchronization signal through one of the two buffer circuits;
two synchronization signal terminators having one ends respectively connected to both ends of the transmission line, and the other ends respectively connected to two synchronization signal terminator power supply electrodes; and
m (2≤m, m is an integer) individual driving circuits that receive the synchronization signal from different positions of the transmission line, wherein
the transmission line receives the synchronization signal through the buffer circuit disposed on a side where an optical signal is input, and
an i (1≤i≤m, i is an integer)-th individual driving circuit counted from the side where the optical signal is input outputs a signal obtained by amplifying a digital input signal in synchronization with the synchronization signal to an i-th waveguide-type optical phase modulator region among at least m waveguide-type optical phase modulator regions arranged on an optical waveguide that is formed in the optical modulator to guide the optical signal.

(Supplementary note 10) The integrated circuit for driving an optical modulator according to Supplementary note 9, wherein
the buffer circuit disposed on a side where the synchronization signal is input is supplied with a fixed voltage through one of the buffer circuit power supply electrodes,
the other buffer circuit power supply electrode connected to the other buffer circuit is open,
the one buffer circuit power supply electrode connected to the synchronization signal terminator disposed on the side where the synchronization signal is input is open, and
the other synchronization signal terminator is connected to a fixed potential through the other synchronization signal power supply electrode.

(Supplementary note 11) The integrated circuit for driving an optical modulator according to Supplementary note 9 or 10, wherein driving voltages having the same amplitude are respectively applied to the waveguide-type optical phase modulator regions.

(Supplementary note 12) The integrated circuit for driving an optical modulator according to any one of Supplementary notes 9 to 11, wherein the waveguide-type optical phase modulator regions are obtained by applying the Franz=Keldysh effect or quantum confined Stark effect in a semiconductor, or the Pockels effect in an electro-optic crystal.

(Supplementary note 13) The integrated circuit for driving an optical modulator according to any one of Supplementary notes 9 to 12, further comprising:

m driving signal lines that connect the waveguide-type optical phase modulator regions with the individual driving circuits; and m terminators connected between a ground potential and each of the m driving signal lines.

(Supplementary note 14) The integrated circuit for driving an optical modulator according to any one of Supplementary notes 9 to 13, wherein the m individual driving circuits are monolithically integrated on a semiconductor substrate.

(Supplementary note 15) The integrated circuit for driving an optical modulator according to Supplementary note 13, wherein the m individual driving circuits and the m terminators are monolithically integrated on a semiconductor substrate.

(Supplementary note 16) The integrated circuit for driving an optical modulator according to Supplementary note 13 or 15, wherein the optical modulator and the m terminators are monolithically integrated on a semiconductor substrate.

(Supplementary note 17) A method for modulating an optical signal, comprising:

inputting a synchronization signal to a transmission line through a buffer circuit disposed on a side where an optical signal is input, in two buffer circuits that are supplied with power separately from two buffer circuit power supply electrodes, the transmission line being connected between outputs of the two buffer circuits;

inputting the synchronization signal to m (2≤m, m is an integer) individual driving circuits from different positions of the transmission line; and outputting, by an i (1≤i≤m, i is an integer)-th individual driving circuit counted from the side where the optical signal is input, a signal obtained by amplifying a digital input signal in synchronization with the synchronization signal to an i-th waveguide-type optical phase modulator region among at least m waveguide-type optical phase modulator regions arranged on an optical waveguide that is formed in an optical modulator to guide the optical signal, both ends of the transmission line being connected to two synchronization signal terminator power supply electrodes through two synchronization signal terminators, respectively.

The present invention has been described above with reference to exemplary embodiments, but the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2011-169123, filed on Aug. 2, 2011, the disclosure of which is incorporated herein in its entirety by reference.

INDUSTRIAL APPLICABILITY

The present invention can be applied to various optical transmission systems for optical fiber communication in trunk line networks, metropolitan area networks, and access networks, for example.

REFERENCE SIGNS LIST

1 LINEAR ACCELERATOR-TYPE COLUMN ELECTRODE STRUCTURE MZ OPTICAL MODULATOR
2, 202a, 202b INTEGRATED CIRCUIT
3, 203 DRIVING SIGNAL LINE
4, 204 POTENTIAL CLAMP MEANS
11, 11a, 211, 211a SEMICONDUCTOR OPTICAL WAVEGUIDE
12a, 12b, 212 OPTICAL DEMULTIPLEXER
13 LINEAR ACCELERATOR-TYPE COLUMN ELECTRODE STRUCTURE OPTICAL PHASE MODULATOR
14, 214 WAVEGUIDE-TYPE OPTICAL PHASE MODULATOR REGION
21, 221 INDIVIDUAL DRIVING CIRCUIT
22, 222 TERMINATOR
23 TRANSMISSION LINE
24a, 24b CLOCK BUFFER CIRCUIT
25a, 25b CLOCK TERMINATOR
100 LINEAR ACCELERATOR-TYPE COLUMN ELECTRODE STRUCTURE MZ OPTICAL MODULATOR MODULE
200 DIGITAL SEGMENTED ELECTRODE STRUCTURE MULTILEVEL OPTICAL MODULATOR MODULE
201 DIGITAL SEGMENTED ELECTRODE STRUCTURE OPTICAL MODULATOR
213 DIGITAL SEGMENTED ELECTRODE STRUCTURE OPTICAL PHASE MODULATOR
223 BRANCH
224 DRIVING CIRCUIT
225 PHASE SHIFT CIRCUIT
226 TERMINATOR
CLK CLOCK SIGNAL
Clk_L, Clk_R CLOCK SIGNAL ELECTRODE
$D_1$-$D_6$ DIGITAL INPUT SIGNAL
Offset OFFSET SIGNAL
VBa, VBb CLOCK BUFFER CIRCUIT POWER SUPPLY ELECTRODE
VCa, VCb CLOCK TERMINATOR POWER SUPPLY ELECTRODE

What is claimed is:

1. An optical modulator module comprising:
an optical modulator that modulates an optical signal input from one end thereof; and
an integrated circuit that controls a modulation operation of the optical modulator, wherein
the optical modulator comprises:
an optical waveguide that guides the optical signal; and
at least m (2≤m, m is an integer) waveguide-type optical phase modulator regions arranged on the optical waveguide,
the integrated circuit comprises:
two buffer circuits that are supplied with power separately from two buffer circuit power supply electrodes;
a transmission line that is connected between outputs of the two buffer circuits and receives a synchronization signal through one of the two buffer circuits;
two synchronization signal terminators having one ends respectively connected to both ends of the transmission line, and the other ends respectively connected to two synchronization signal terminator power supply electrodes; and
m individual driving circuits that receive the synchronization signal from different positions of the transmission line, wherein
the transmission line receives the synchronization signal through the buffer circuit disposed on a side where the optical signal is input, and an i (1≤i≤m, i is an integer)-th individual driving circuit counted from the side where the optical signal is input outputs a signal obtained by amplifying a digital input signal in synchronization with the synchronization signal to an i-th waveguide-type optical phase modulator region.

2. The optical modulator module according to claim 1, wherein
the buffer circuit disposed on a side where the synchronization signal is input is supplied with a fixed voltage through one of the buffer circuit power supply electrodes,
the other buffer circuit power supply electrode connected to the other buffer circuit is open,
the one synchronization signal terminator power supply electrode connected to the synchronization signal terminator disposed on the side where the synchronization signal is input is open, and
the other synchronization signal terminator is connected to a fixed potential through the other synchronization signal terminator power supply electrode.

3. The optical modulator module according to claim 1, wherein driving voltages having the same amplitude are respectively applied to the waveguide-type optical phase modulator regions.

4. The optical modulator module according to claim 1, wherein the waveguide-type optical phase modulator regions are obtained by applying the Franz=Keldysh effect or quantum confined Stark effect in a semiconductor, or the Pockels effect in an electro-optic crystal.

5. The optical modulator module according to claim 1, further comprising:
m driving signal lines that connect the waveguide-type optical phase modulator regions with the individual driving circuits; and
m terminators connected between a ground potential and each of the m driving signal lines.

6. The optical modulator module according to claim 1, wherein the m individual driving circuits are monolithically integrated on a semiconductor substrate.

7. The optical modulator module according to claim 5, wherein the m individual driving circuits and the m terminators are monolithically integrated on a semiconductor substrate.

8. The optical modulator module according to claim 5, wherein the optical modulator and the m terminators are monolithically integrated on a semiconductor substrate.

9. An integrated circuit for driving an optical modulator, comprising:
two buffer circuits that are supplied with power separately from two buffer circuit power supply electrodes;
a transmission line that is connected between outputs of the two buffer circuits and receives a synchronization signal through one of the two buffer circuits;
two synchronization signal terminators having one ends respectively connected to both ends of the transmission line, and the other ends respectively connected to two synchronization signal terminator power supply electrodes; and
m (2≤m, m is an integer) individual driving circuits that receive the synchronization signal from different positions of the transmission line and output signals based on the synchronization signal to an optical modulator receiving an optical signal, wherein
the transmission line receives the synchronization signal through the buffer circuit disposed on a side where the optical signal is input, and
an i (1≤i≤m, i is an integer)-th individual driving circuit counted from the side where the optical signal is input outputs a signal obtained by amplifying a digital input signal in synchronization with the synchronization signal to an i-th waveguide-type optical phase modulator region among at least m waveguide-type optical phase modulator regions arranged on an optical waveguide that is formed in the optical modulator to guide the optical signal.

10. The integrated circuit for driving an optical modulator according to claim 9, wherein
the buffer circuit disposed on a side where the synchronization signal is input is supplied with a fixed voltage through one of the buffer circuit power supply electrodes,
the other buffer circuit power supply electrode connected to the other buffer circuit is open,
the one buffer circuit power supply electrode connected to the synchronization signal terminator disposed on the side where the synchronization signal is input is open, and
the other synchronization signal terminator is connected to a fixed potential through the other synchronization signal power supply electrode.

11. The integrated circuit for driving an optical modulator according to claim 9, wherein driving voltages having the same amplitude are respectively applied to the waveguide-type optical phase modulator regions.

12. The integrated circuit for driving an optical modulator according to claim 9, wherein the waveguide-type optical phase modulator regions are obtained by applying the Franz=Keldysh effect or quantum confined Stark effect in a semiconductor, or the Pockels effect in an electro-optic crystal.

13. The integrated circuit for driving an optical modulator according to claim 9, further comprising:
m driving signal lines that connect the waveguide-type optical phase modulator regions with the individual driving circuits; and
m terminators connected between a ground potential and each of the m driving signal lines.

14. The integrated circuit for driving an optical modulator according to claim 9, wherein the m individual driving circuits are monolithically integrated on a semiconductor substrate.

15. The integrated circuit for driving an optical modulator according to claim 13, wherein the m individual driving circuits and the m terminators are monolithically integrated on a semiconductor substrate.

16. The integrated circuit for driving an optical modulator according to claim 13, wherein the optical modulator and the m terminators are monolithically integrated on a semiconductor substrate.

17. A method for modulating an optical signal, comprising:
inputting a synchronization signal to a transmission line through a buffer circuit disposed on a side where an optical signal is input, in two buffer circuits that are supplied with power separately from two buffer circuit power supply electrodes, the transmission line being connected between outputs of the two buffer circuits;
inputting the synchronization signal to m (2≤m, m is an integer) individual driving circuits from different positions of the transmission line; and
outputting, by an i (1≤i≤m, i is an integer)-th individual driving circuit counted from the side where the optical signal is input, a signal obtained by amplifying a digital input signal in synchronization with the synchronization signal to an i-th waveguide-type optical phase modulator region among at least m waveguide-type optical phase modulator regions arranged on an optical waveguide that is formed in an optical modulator to guide the optical signal, both ends of the transmission line being connected to two synchronization signal terminator power supply electrodes through two synchronization signal terminators, respectively.

* * * * *